(12) United States Patent
Sekigawa et al.

(10) Patent No.: US 7,508,492 B2
(45) Date of Patent: Mar. 24, 2009

(54) SURFACE LIGHT SOURCE CONTROL APPARATUS AND SURFACE LIGHT SOURCE CONTROL METHOD

(75) Inventors: Kazunari Sekigawa, Nagano (JP); Hiroaki Samizu, Nagano (JP); Takahiro Inoue, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 468 days.

(21) Appl. No.: 11/449,352

(22) Filed: Jun. 8, 2006

(65) Prior Publication Data

US 2006/0279720 A1    Dec. 14, 2006

(30) Foreign Application Priority Data

Jun. 8, 2005  (JP)  ............................. 2005-168599

(51) Int. Cl.
*G03B 27/54* (2006.01)
*G03B 27/72* (2006.01)

(52) U.S. Cl. .......................................... 355/67; 355/69

(58) Field of Classification Search .................. 355/67, 355/53, 77, 66, 68, 69; 378/34, 35; 430/30, 430/322; 250/548
See application file for complete search history.

(56) References Cited

U.S. PATENT DOCUMENTS

2004/0174512 A1*  9/2004  Toyoda et al. ................. 355/67

FOREIGN PATENT DOCUMENTS

| JP | 10-112579 | 4/1998 |
| JP | 2002-367900 | 12/2002 |
| JP | 2004-146789 | 5/2004 |

* cited by examiner

*Primary Examiner*—Peter B Kim (57) ABSTRACT

A surface light source control apparatus for a direct exposure apparatus comprises a light-emission level determining means for determining the light-emission level of each point light source for each of a plurality of groups so that a uniform illuminance distribution is achieved at a position corresponding to an exposure surface of an exposure target when a projection device is set so as to reflect all light rays incident thereon toward the exposure surface, the plurality of groups being formed in advance by grouping the point light sources based on similarity in tendency in terms of illuminance distribution characteristics that the point light sources have at the position corresponding to the exposure surface, wherein the light-emission level determining means determines the light-emission level so that all the point light sources belonging to the same group have the same light-emission level.

16 Claims, 7 Drawing Sheets

| DATA NUMBER i | x | YA | YB | YC |
|---|---|---|---|---|
| 1 | 2 | 1 | 0 | 0 |
| 2 | 1.9 | 1 | 0 | 0 |
| 3 | 1.8 | 1 | 0 | 0 |
| 4 | 1.5 | 1 | 1 | 0 |
| 5 | 1 | 0 | 1 | 0 |
| 6 | 0.5 | 0 | 1 | 0 |
| 7 | 0.3 | 0 | 1 | 1 |
| 8 | 0.2 | 0 | 0 | 1 |
| 9 | 0.1 | 0 | 0 | 1 |
| 10 | 0 | 0 | 0 | 1 |
| CORRELATION COEFFICIENT RELATIVE TO x | - | 0.92 | -0.11 | -0.83 |

Fig.8 under the US 7,508,492 B2

SURFACE LIGHT SOURCE CONTROL APPARATUS AND SURFACE LIGHT SOURCE CONTROL METHOD

BACKGROUND OF THE INVENTION

1. Field of the Invention

The present invention relates to a surface light source control apparatus and a surface light source control method for a direct exposure apparatus which, using a surface light source constructed from a plurality of point light sources, projects light onto an exposure surface of an exposure target (exposure target substrate) moving relative to the surface light source.

2. Description of the Related Art

Generally, a wiring pattern on a wiring substrate is formed by exposing the substrate based on wiring pattern design data and by developing the desired pattern on the substrate, followed by etching. In one method of exposure, the exposure is performed using a photomask.

On the other hand, a patterning method based on direct exposure that does not use photomasks has been proposed in recent years. According to this method, since corrections for the expansion, shrinkage, distortion, misalignment, etc. of the exposure target (exposure target substrate) can be made in real time or in advance at the exposure data generation stage, remarkable improvements can be achieved in such aspects as an improvement of the manufacturing accuracy, an improvement of the manufacturing yield, a reduction of the delivery time, and a reduction of the manufacturing cost.

As one example of the patterning method based on direct exposure, Japanese Unexamined Patent Publication No. 10-112579 discloses a method that forms an exposure pattern by direct exposure using a Digital Micromirror Device (DMD).

Figure 7:
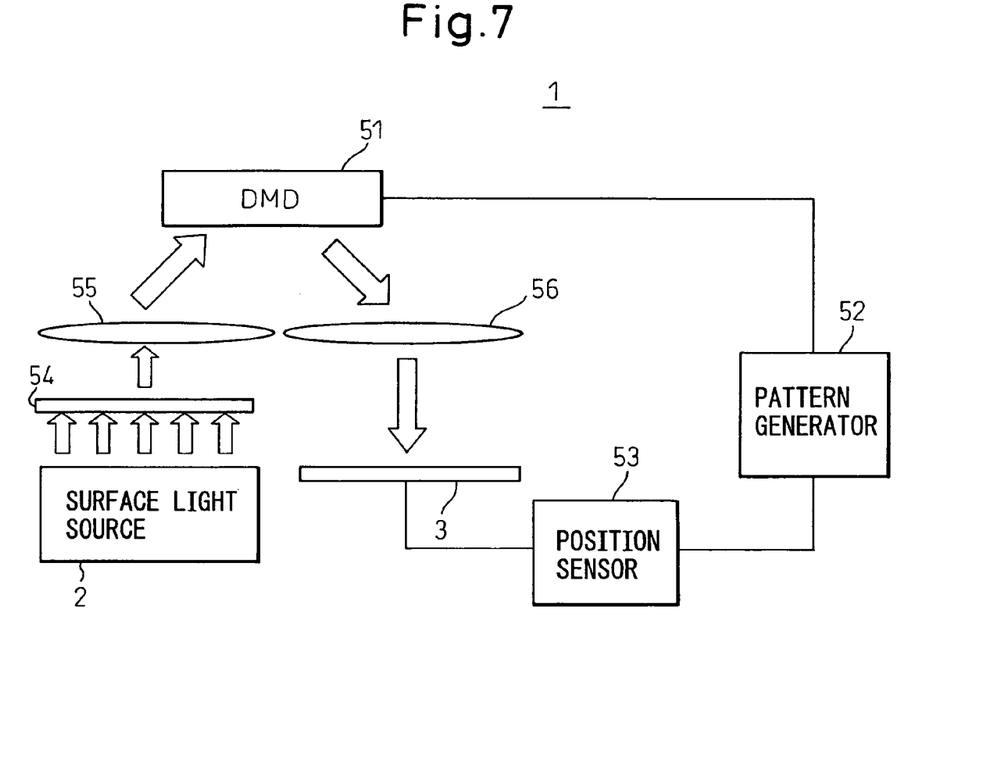
FIG. 7 is a diagram illustrating one prior art example of a direct exposure apparatus using a DMD.

FIG. 7 is a diagram illustrating one prior art example of a direct exposure apparatus using the DMD. When directly exposing the resist formed on an exposure target substrate 3 moving relative to the DMD 51, pattern data corresponding to the pattern to be exposed is generated by a pattern generator 52, and this pattern data is applied to the DMD 51. The pattern generator 52 operates in conjunction with a position sensor 53 that detects the position of the exposure target substrate 3 moving in relative fashion, and the pattern generator 52 thus generates the pattern data in a manner synchronized with the position of the exposure target substrate 3. A surface light source 2 projects light onto the DMD 51 through a diffusion plate 54 and a lens 55. The DMD 51 causes each of its tiny mirrors (micromirrors) to tilt according to the pattern data, thereby suitably changing the reflection direction of the light incident on each micromirror of the DMD 51; the resulting light is projected through a lens 56 onto the resist on the exposure target substrate 3 to form the exposure pattern corresponding to the pattern data.

In the direct exposure method, the light source for projecting the light onto the exposure target substrate must be constructed to provide uniform and evenly distributed light over the entire surface of the exposure target substrate in order to achieve a good exposure result.

Figure 8:
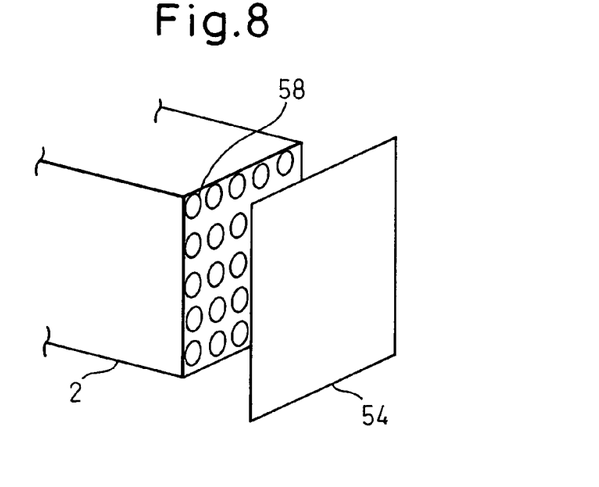
FIG. 8 is a diagram showing one prior art example in which a surface light source comprising a plurality of point light sources is employed in order to provide uniform illumination in the direct exposure apparatus.

FIG. 8 is a diagram showing one prior art example in which a surface light source comprising a plurality of point light sources is employed in order to provide uniform illumination in the direct exposure apparatus. The surface light source 2 is constructed by arranging the plurality of point light sources 58 in a two-dimensional array. The light from each point light source is first converged using an optical fiber and then converted by a convex lens into parallel light; then, the rays of parallel light are passed through the diffusion plate 54 to eliminate any "unevenness in illuminance," and the thus produced light is projected onto the DMD 51 in FIG. 7.

In an alternative technique, light produced from a point light source is divided into a plurality of segments to achieve multiple light sources in an equivalent manner, and their light levels are equalized to achieve a surface light source.

Further, in Japanese Unexamined Patent Publication No. 2002-367900, there is disclosed a technique that provides uniform illumination over the entire surface of the exposure target substrate by controlling the tilt angle of each micromirror of the DMD based on data concerning the distribution of the amount of image light (the illuminance distribution) on the exposure target substrate.

Japanese Unexamined Patent Publication No. 2004-146789 also discloses a technique for providing uniform illumination over the entire surface of the exposure target substrate; according to this technique, the exposure is performed in the direction of scanning while displacing the exposure area in a direction orthogonal to the scanning direction in such a manner that the exposure area overlaps an exposure area adjacent to it.

When the surface light source is constructed by arranging a plurality of point light sources, if a method is employed that measures the illuminance distribution on the exposure surface of the exposure target substrate and that performs feedback control, using the measured results, to control the light-emission level of each individual point light source so that a uniform illuminance distribution is achieved over the entire exposure surface of the exposure target substrate, the amount of computation will become enormous, which is not desirable. Likewise, in the technique disclosed in Japanese Unexamined Patent Publication No. 2002-367900, the tilt angle of each micromirror is controlled so that a uniform illuminance distribution is achieved over the entire exposure surface of the exposure target substrate, but controlling the tilt angle of each individual micromirror by feedback control would not be desirable because it would require an enormous amount of computation. Such an increase in the amount of computation means that it takes a considerable time to determine the light-emission levels of all the point light sources that can achieve the uniform illuminance distribution.

In view of the above problem, it is an object of the present invention to provide a surface light source control apparatus and a surface light source control method for a direct exposure apparatus, wherein provisions are made to efficiently equalize the luminous intensity of a surface light source constructed from a plurality of point light sources.

SUMMARY OF THE INVENTION

To achieve the above object, according to the present invention, first the plurality of light sources forming the surface light source are divided in advance into a plurality of groups based on similarity in tendency in terms of illuminance distribution characteristics that the point light sources have at the position corresponding to the exposure surface of the exposure target (exposure target substrate). Then, the light-emission level of each point light source is determined for each group so that a uniform illuminance distribution is achieved at the position corresponding to the exposure surface of the exposure target when a projection device for generating the exposure pattern in the direct exposure apparatus is set so as to reflect all light rays incident thereon. Here, the light-emission level is determined so that all the point light sources belonging to the same group have the same light-emission level.

That is, the surface light source control apparatus for the direct exposure apparatus according to the present invention comprises a light-emission level determining means for determining the light-emission level of each point light source for each of the plurality of groups so that a uniform illuminance distribution is achieved at the position corresponding to the exposure surface of the exposure target substrate when the projection device is set so as to reflect all the light rays incident thereon toward the exposure surface, the plurality of groups being formed in advance by grouping the point light sources based on similarity in tendency in terms of illuminance distribution characteristics that the point light sources have at the position corresponding to the exposure surface of the exposure target substrate. The light-emission level determining means determines the light-emission level so that all the point light sources belonging to the same group have the same light-emission level.

The surface light source control method for the direct exposure apparatus according to the present invention comprises: a grouping step for dividing the point light sources into a plurality of groups based on similarity in tendency in terms of illuminance distribution characteristics that the point light sources have at the position corresponding to the exposure surface of the exposure target substrate when the projection device is set so as to reflect all the light rays incident thereon toward the exposure surface; and a light-emission level determining step for determining the light-emission level of each point light source for each of the plurality of groups so that a uniform illuminance distribution is achieved at the position corresponding to the exposure surface of the exposure target substrate when the projection device is set so as to reflect all the light rays incident thereon toward the exposure surface. The light-emission level determining step determines the light-emission level so that all the point light sources belonging to the same group have the same light-emission level.

BRIEF DESCRIPTION OF THE DRAWINGS

The present invention will be more clearly understood from the description as set below with reference to the accompanying drawings, wherein.

DESCRIPTION OF THE PREFERRED EMBODIMENTS

Figure 1:
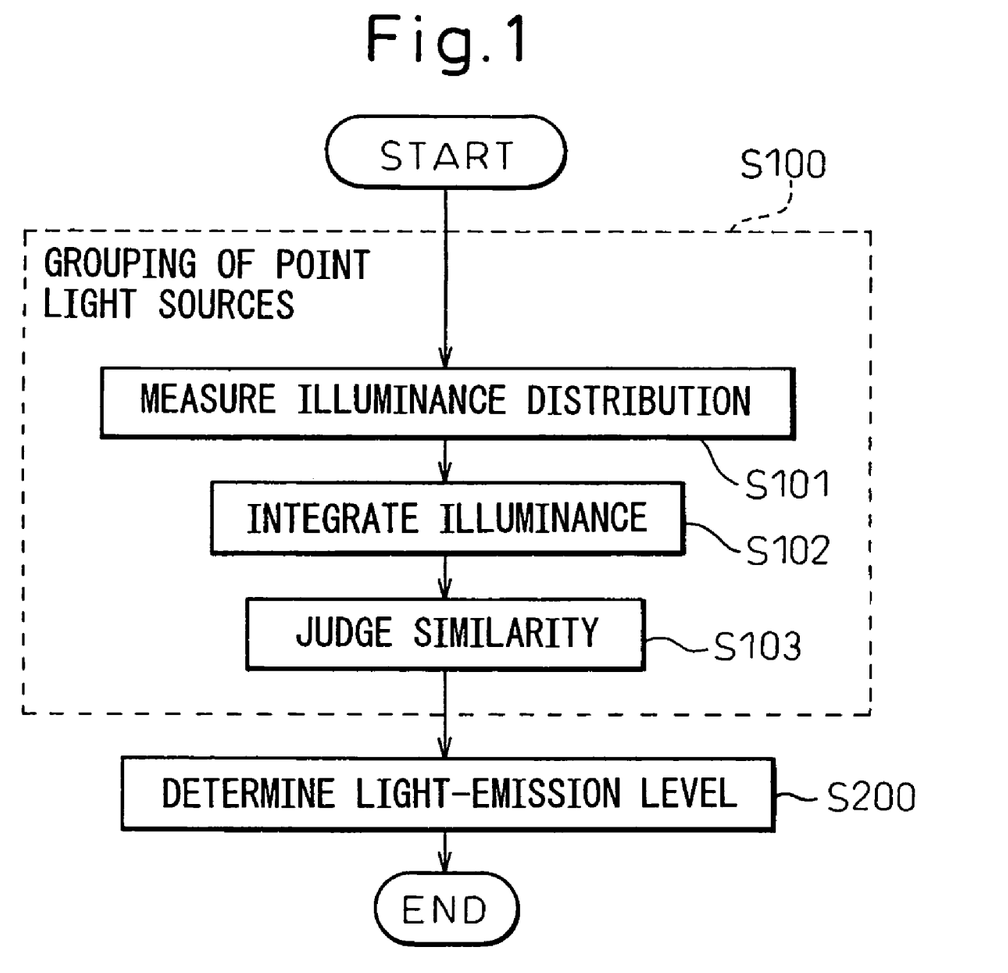
FIG. 1 is a flowchart showing the operation flow of a surface light source control method for a direct exposure apparatus according to an embodiment of the present invention.

In a direct exposure apparatus, light produced by a surface light source constructed from a plurality of point light sources is directed to a projection device for generating an exposure pattern, and the light reflected by the projection device is projected onto an exposure surface of an exposure target substrate moving relative to the projection device, thereby forming a desired exposure pattern on the exposure surface. FIG. 1 is a flowchart showing the operation flow of a surface light source control method for such a direct exposure apparatus according to an embodiment of the present invention.

First, in step S100, the point light sources are divided into a plurality of groups based on similarity in tendency in terms of illuminance distribution characteristics that the point light sources have at the position corresponding to the exposure surface of the exposure target substrate when the projection device for generating the exposure pattern in the direct exposure apparatus is set so as to reflect all the light rays incident thereon toward the exposure surface.

When the projection device is, for example, a DMD, in the exposure process the tiny mirrors (micromirrors) on the DMD are caused to tilt according to the pattern data, thereby suitably changing the reflection direction of the light incident on the DMD and thus forming the desired exposure pattern on the exposure surface of the exposure target substrate. However, when dividing the point light sources into groups in step S100, the micromirrors on the DMD are caused to tilt so that all the light rays incident thereon are reflected toward the exposure surface of the exposure target substrate.

The grouping of the point light sources in step S100 is accomplished in steps S101 to S103.

In step S101, the projection device is set so that all the light rays incident thereon are reflected toward the exposure surface of the exposure target substrate; in this condition, the point light sources are turned on one at a time, and the illuminance distribution at the position corresponding to the exposure surface of the exposure target substrate is measured. In step S101, the illuminance distribution is measured for each point light source.

Next, in step S102, for the illuminance distribution measured for each point light source in step S101, the intensity of illuminance associated with the point light source is integrated along the direction of relative movement of the exposure target substrate. In this way, the distribution of illuminance integrated values along the direction orthogonal to the direction of relative movement of the exposure target substrate is computed. The illuminance integrated value distribution is computed for each point light source.

Figure 2:
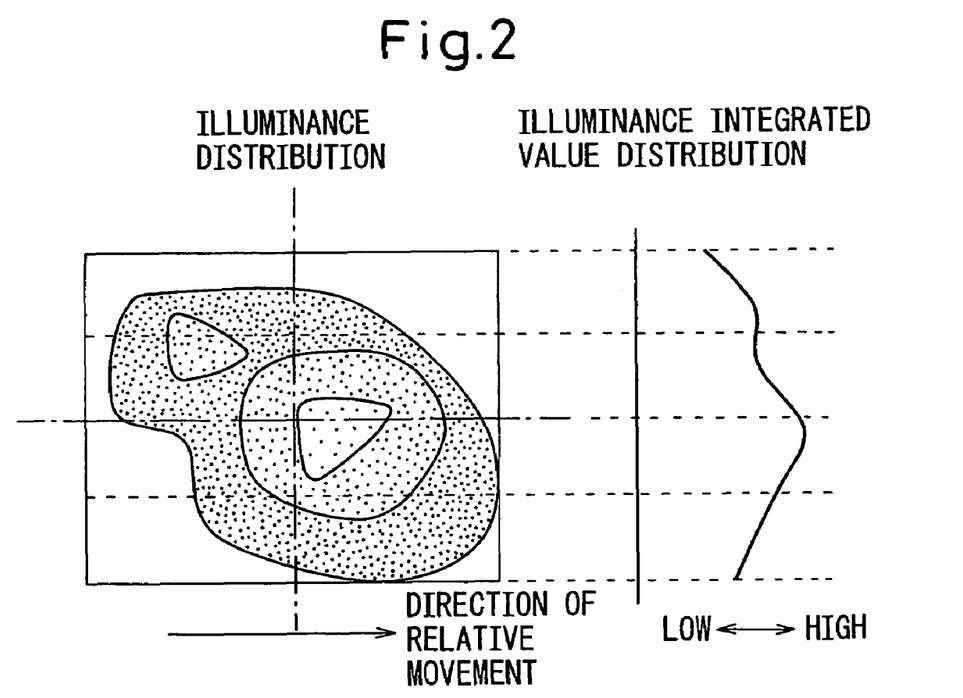
FIG. 2 is a diagram showing one example of the relationship between an illuminance distribution and an illuminance integrated value distribution.

FIG. 2 is a diagram showing one example of the relationship between the illuminance distribution and the illuminance integrated value distribution. In the figure, darker shading represents lower illuminance. The direction of the arrow in the figure indicates the direction of relative movement of the exposure target substrate. In the illuminance distribution shown in FIG. 2, when the intensity of illuminance is integrated along the direction of relative movement of the exposure target substrate, the illuminance integrated value distribution along the direction orthogonal to the direction of relative movement of the exposure target substrate is obtained as shown in the figure. The higher the intensity of illuminance, the larger the illuminance integrated value.

In step S103 of FIG. 1, similarity in tendency in terms of the illuminance integrated value distribution among the respective point light sources is judged. Any point light sources judged in step S103 to be similar in tendency in terms of the illuminance integrated value distribution are determined as being similar in tendency in terms of the illuminance distribution characteristics. The grouping is done so that the point light sources similar in tendency in terms of the illuminance distribution characteristics belong to the same group.

In the present embodiment, the similarity is judged in step S103 by obtaining the correlation coefficient between the illuminance integrated value distributions associated with the respective point light sources. The correlation coefficient is a coefficient generally used as a parameter representing the similarity between numeric values, and is defined as shown by equation (1) below.

$$\text{CORRELATION COEFFICIENT} = \frac{\frac{1}{n}\sum_{i=1}^{n}(x_i - \mu_x) \times (y_i - \mu_y)}{\sigma_x \times \sigma_y} \quad (1)$$

Here, n represents the number of data, $x_i$ designates the i-th data in data x, and $y_i$ designates the i-th data in data y. Further, $\mu_x$ denotes the average value of the data x, and $\mu_y$ the average value of the data y. On the other hand, $\sigma_x$ denotes the standard deviation of the data x while $\sigma_y$ denotes the standard deviation of the data y. That is, as shown by equation (1), the correlation coefficient used in the present embodiment is normalized so as to fall within the range of "−1" to "+1" by dividing the product of the difference between the data x and its average value and the difference between the data y and its average value by the product of the standard deviations of the data x and data y. The closer the correlation coefficient is to "+1", the greater the similarity; conversely, the closer the correlation coefficient is to "−1", the greater the dissimilarity.

Figure 3:
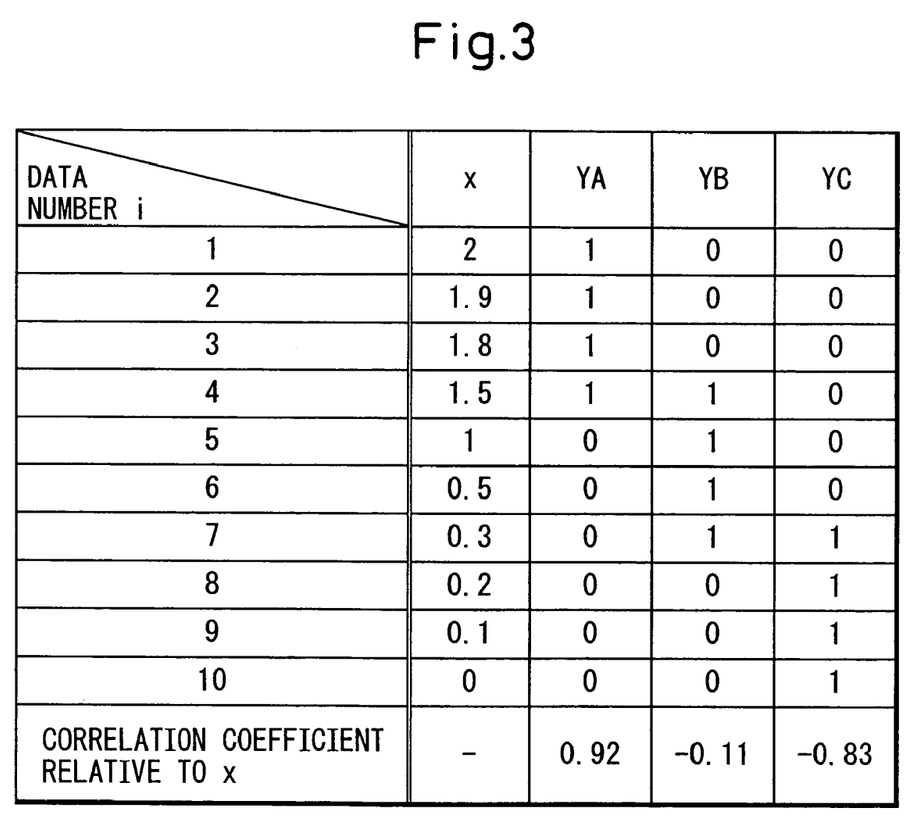
FIG. 3 is a diagram for explaining one specific example of how similarity is judged using a correlation coefficient.

FIG. 3 is a diagram for explaining one specific example of how the similarity is judged using the correlation coefficient. The example shown here deals with the case where the similarity of the data x representing the illuminance integrated value distribution computed for a given point light source is judged relative to data YA, YB, and YC representing the illuminance integrated value distributions respectively computed for three other point light sources. It is assumed here that the data x, YA, YB, and YC are each discretized at a prescribed resolution, that is, into 10 data values in the example of FIG. 3, along the direction orthogonal to the direction of relative movement of the exposure target substrate. The resolution level at which to discretize the data should be determined appropriately by considering various factors such as the accuracy necessary for grouping the point light sources and the time and cost that can be spent to determine the light-emission levels of the point light sources.

As shown in FIG. 3, the correlation coefficient of the data x is "0.92", "−0.11", and "−0.83" for the data YA, YB, and YC, respectively. From these correlation coefficients, it can be judged that the data x has high similarity to the data YA but is entirely dissimilar to the data YC.

After grouping the point light sources as described above, in step S200 of FIG. 1 the light-emission level of each point light source is determined for each of the plurality of groups so that a uniform illuminance distribution is achieved at the position corresponding to the exposure surface of the exposure target substrate when the projection device is set so as to reflect all the light rays incident thereon toward the exposure surface of the exposure target substrate. Here, the light-emission level is determined so that all the point light sources belonging to the same group have the same light-emission level.

Figure 4:
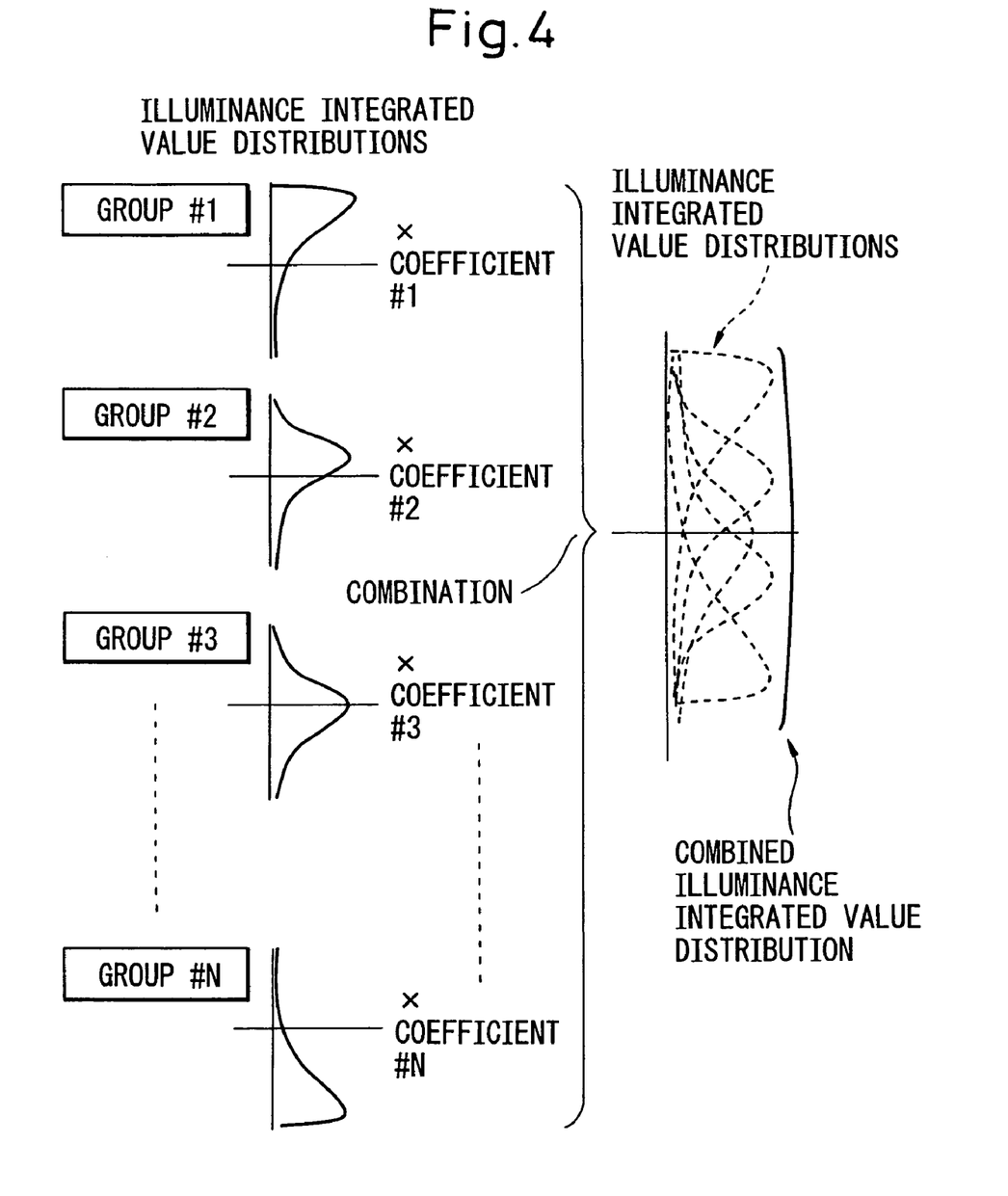
FIG. 4 is a diagram for explaining how the light-emission levels of point light sources are determined in the embodiment of the present invention.

FIG. 4 is a diagram for explaining how the light-emission levels of the point light sources are determined in the embodiment of the present invention. As a result of the point light source grouping done in step S100 of FIG. 1, the illuminance distribution characteristics of the point light sources are classified into as many kinds of illuminance integrated value distributions as there are groups. In the example of FIG. 4, N kinds of illuminance integrated value distributions are shown, assuming that the point light sources are divided into N groups. In the present embodiment, the N kinds of illuminance integrated value distributions are suitably combined so that a uniform illuminance distribution is achieved at the position corresponding to the exposure surface of the exposure target substrate, that is, it is determined how the N kinds of illuminance integrated value distributions are combined so that the combined illuminance integrated value distribution becomes uniform. As the point light sources belonging to the same group have the same light-emission level, determining how the illuminance integrated value distributions are combined is equivalent to determining the light-emission levels to be assigned to the respective groups. More specifically, as shown in FIG. 4, the illuminance integrated value distributions for the respective groups #i (where i=1 to N) are multiplied by respective coefficients (so-called gains) #i (where i=1 to N) each representing the "light-emission level command value for the point light sources belonging to the same group," and the results of the multiplications are combined to provide a combined illuminance integrated value distribution; here, the values of the respective coefficients #i (where i=1 to N) are determined so that a uniform illuminance integrated value distribution is obtained when the results of the multiplications are combined.

For example, consider the case where the point light sources are laser diodes and the light-emission level of each laser diode is adjustable with a 1024-step resolution. When the surface light source is constructed by arranging 96 laser diodes, there are as many as $1024^{96} = 1.024 \times 10^{288}$ possible control patterns to obtain the desired illuminance as the surface light source. By contrast, when the 96 laser diodes are divided, for example, into six groups according to the present invention, the number of possible control patterns is $1024^{6} = 1.024 \times 10^{18}$, achieving a drastic reduction in the amount of computation.

Figure 5:
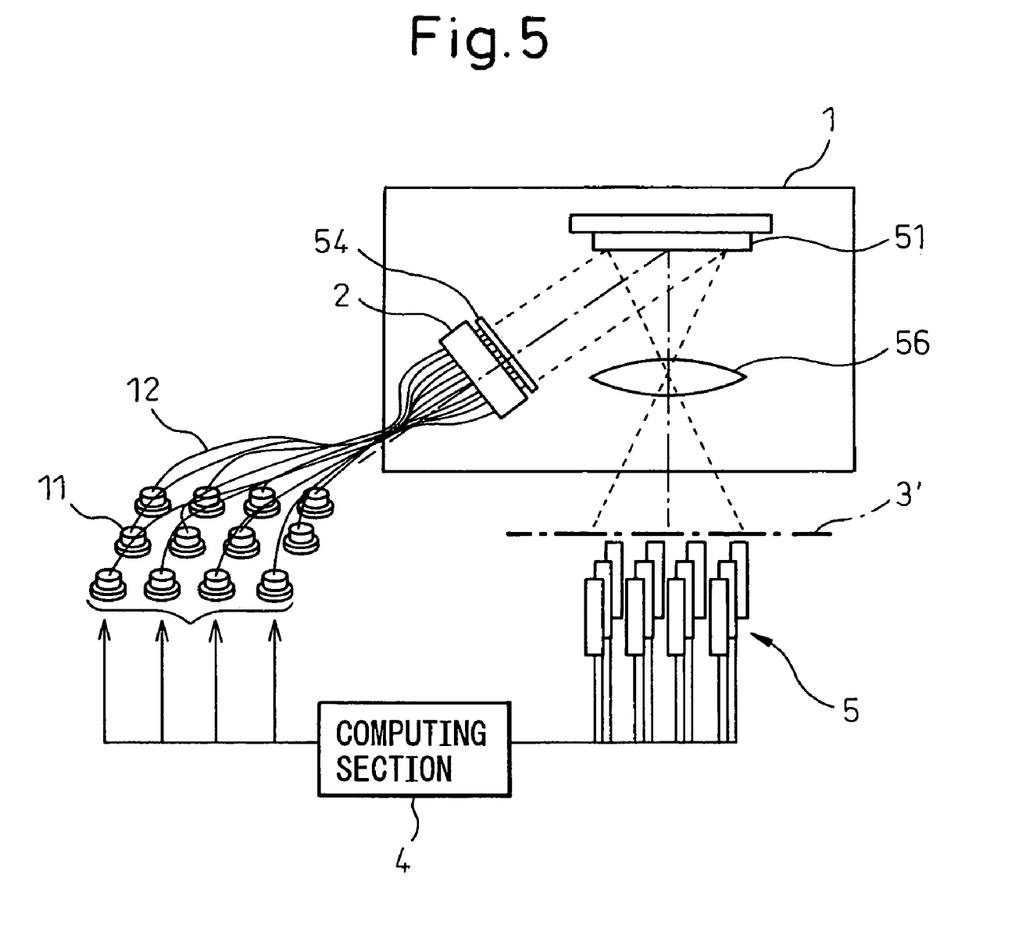
FIG. 5 is a diagram showing the basic configuration of a surface light source control apparatus for the direct exposure apparatus according to the embodiment of the present invention.

FIG. 5 is a diagram showing the basic configuration of the surface light source control apparatus for the direct exposure apparatus according to the embodiment of the present invention.

The surface light source 2 in the direct exposure apparatus 1 is constructed from a two-dimensional array of optical fibers 12 for guiding therethrough the light emitted from a plurality of laser diodes 11. The surface light source 2 projects the light onto a DMD 51 through a diffusion plate 54. The DMD 51 causes each of its micromirrors to tilt according to the pattern data, thereby suitably changing the reflection direction of the light incident on each micromirror of the DMD 51; the resulting light is projected through a lens 56 onto the resist on the exposure target substrate 3 moving relative to the DMD 51, thereby forming the exposure pattern corresponding to the pattern data.

A sensor section 5 is provided near the position 3' corresponding to the exposure surface of the exposure target substrate. For example, for 96 laser diodes 11, the sensor section 5 is constructed from an array consisting, for example, of five sensors vertically and seven sensors horizontally. Alternatively, the sensor section 5 may be constructed using line sensors. The sensor section 5 is used to measure the illuminance distribution at the position 3' corresponding to the exposure surface of the exposure target substrate when the laser diodes 11 are turned on one at a time while controlling the DMD 51 so as to reflect all the incident light rays toward the exposure surface of the exposure target substrate 3.

A computing section 4 computes the illuminance integrated value distribution from the illuminance distribution measured by the sensor section 5, and divides the laser diodes 11 into groups by judging the similarity of the illuminance integrated value distribution for each laser diode by using the measured illuminance integrated value distribution. Further, for each of the groups to which the laser diodes 11 belong, the computing section 4 determines the light-emission level of each laser diode 11 so that a uniform illuminance distribution is achieved at the position 3' corresponding to the exposure surface of the exposure target substrate 3 when the DMD 51 is set so as to reflect all the incident light rays toward the exposure surface of the exposure target substrate.

Figure 6:
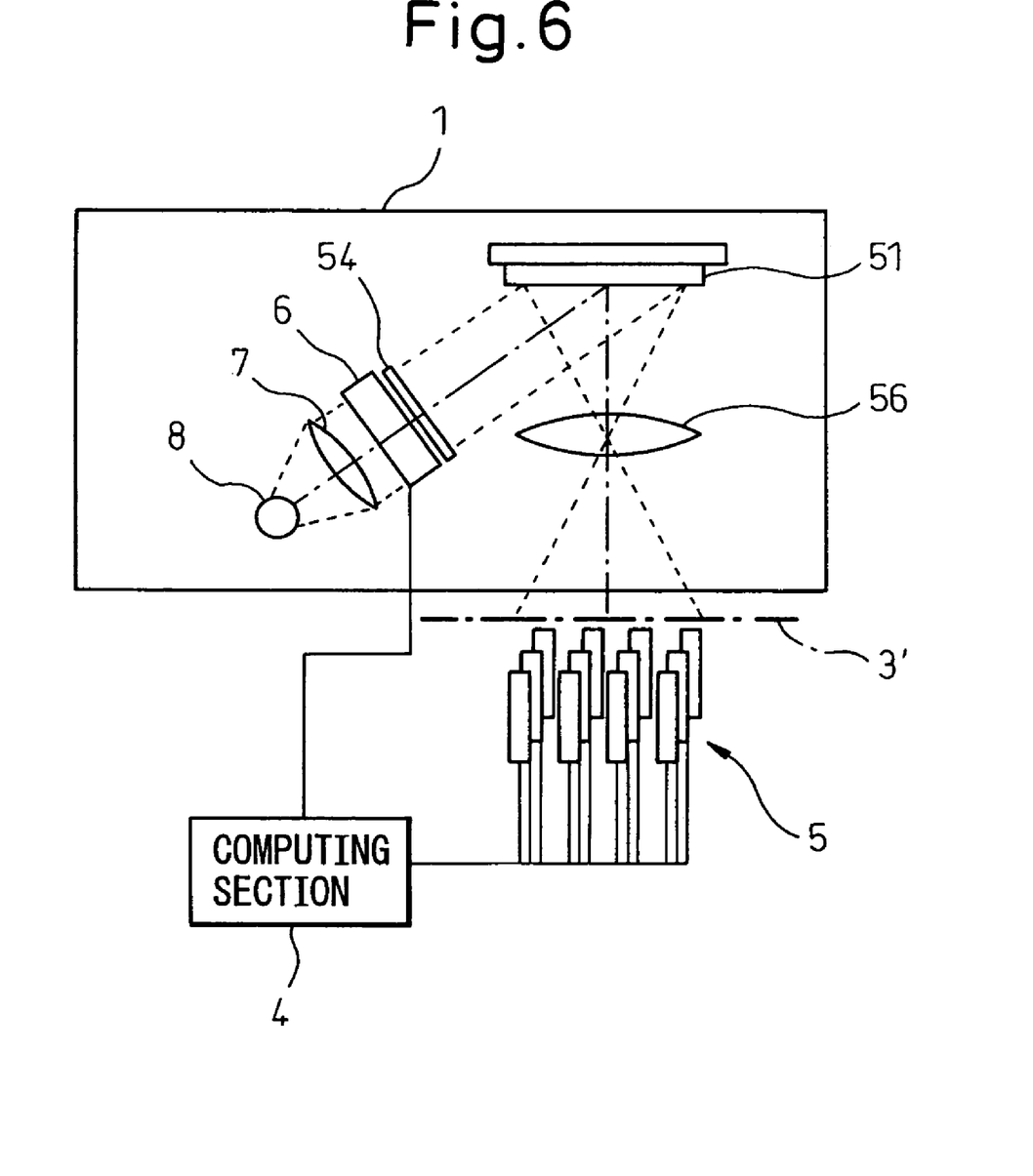
FIG. 6 is a diagram showing the basic configuration of the surface light source control apparatus for the direct exposure apparatus according to a modified example of the embodiment of the present invention.

FIG. 6 is a diagram showing the basic configuration of the surface light source control apparatus for the direct exposure apparatus according to a modified example of the embodiment of the present invention.

This modified example achieves the same effect as the above embodiment by controlling the light transmittance of a liquid crystal panel 6 instead of controlling the light-emission levels of the laser diodes 11 as shown in FIG. 5. That is, as shown in FIG. 6, substantially the same effect as that achieved by the embodiment described with reference to FIG. 5 is obtained by using, instead of the laser diodes, a lens 7 for converting light produced by a lamp 8 into parallel light and the liquid crystal panel 6 whose light transmittance is adjustable.

The liquid crystal panel 6 comprises a matrix array of elements whose light transmittance can be controlled by a voltage. That is, each individual one of the elements arranged in the matrix array corresponds each individual one of the laser diodes described earlier. With each element in the matrix array set to 100% transmittance, the illuminance distribution at the position 3' corresponding to the exposure surface of the exposure target substrate is measured for each element, and the elements are divided into groups based on the similarity in the illuminance distribution characteristics.

Then, for each of the groups to which the elements belong, the computing section 4 determines the light transmittance of the liquid crystal panel 6 so that a uniform illuminance distribution is achieved at the position 3' corresponding to the exposure surface of the exposure target substrate when the DMD 51 is set so as to reflect all the incident light rays toward the exposure surface of the exposure target substrate 3.

According to the present invention, the luminous intensity of the surface light source constructed from a plurality of point light sources can be efficiently equalized, and variations in the amount of exposure during exposure can be efficiently prevented. According to the direct exposure, high-precision wiring formation can be accomplished easily and at high speed, and the wiring density can be increased. Accordingly, the present invention is best suited to applications where complicated wiring patterns that require particularly high precision are formed by direct exposure, and the invention can also fully address the future need for superfine wiring and the resulting increase in the amount of exposure data.

What is claimed is:

1. A surface light source control apparatus for a direct exposure apparatus in which light produced by a surface light source constructed from a plurality of point light sources is directed to a projection device for generating an exposure pattern, and the light reflected by said projection device is projected onto an exposure surface of an exposure target moving relative to said projection device, thereby forming a desired exposure pattern on said exposure surface, said surface light source control apparatus comprising:
light-emission level determining means for determining the light-emission level of each of said point light sources for each of a plurality of groups so that a uniform illuminance distribution is achieved at a position corresponding to said exposure surface of said exposure target when said projection device is set so as to reflect all light rays incident thereon toward said exposure surface, said plurality of groups being formed in advance by grouping said point light sources based on similarity in tendency in terms of illuminance distribution characteristics that said point light sources have at said position corresponding to said exposure surface.

2. A surface light source control apparatus as claimed in claim 1, wherein said light-emission level determining means determines said light-emission level so that all the point light sources belonging to the same group have the same light-emission level.

3. A surface light source control apparatus as claimed in claim 2, comprising:
measuring means for measuring for each of said point light sources the illuminance distribution at said position corresponding to said exposure surface of said exposure target when said point light sources are turned on one at a time while controlling said projection device so as to reflect all the light rays incident thereon toward said exposure surface;
integrating means for computing for each of said point light sources an illuminance integrated value distribution along a direction orthogonal to the direction of said relative movement by integrating the intensity of illuminance associated with said each point light source along the direction of said relative movement based on said illuminance distribution measured for said each point light source; and
judging means for judging similarity in tendency in terms of said illuminance integrated value distribution among said point light sources, wherein
all point light sources judged by said identifying means to be similar in tendency in terms of said illuminance integrated value distribution are determined as being similar in tendency in terms of said illuminance distribution characteristics and are grouped together so as to belong to the same group.

4. A surface light source control apparatus as claimed in claim 3, wherein said judging means judges the similarity in tendency in terms of said illuminance integrated value distribution based on a correlation coefficient between the illuminance integrated value distributions associated with said point light sources.

5. A surface light source control apparatus as claimed in claim 3, wherein for each of said groups, said light-emission level determining means determines based on said illuminance integrated value distribution for said each group the light-emission level of each of said point light sources so that a uniform illuminance distribution is achieved at said position corresponding to said exposure surface of said exposure target when said projection device is set so as to reflect all the light rays incident thereon toward said exposure surface.

6. A surface light source control apparatus as claimed in claim 1, comprising:
measuring means for measuring for each of said point light sources the illuminance distribution at said position corresponding to said exposure surface of said exposure target when said point light sources are turned on one at a time while controlling said projection device so as to reflect all the light rays incident thereon toward said exposure surface;

integrating means for computing for each of said point light sources an illuminance integrated value distribution along a direction orthogonal to the direction of said relative movement by integrating the intensity of illuminance associated with said each point light source along the direction of said relative movement based on said illuminance distribution measured for said each point light source; and judging means for judging similarity in tendency in terms of said illuminance integrated value distribution among said point light sources, wherein all point light sources judged by said identifying means to be similar in tendency in terms of said illuminance integrated value distribution are determined as being similar in tendency in terms of said illuminance distribution characteristics and are grouped together so as to belong to the same group.

7. A surface light source control apparatus as claimed in claim 6, wherein said judging means judges the similarity in tendency in terms of said illuminance integrated value distribution based on a correlation coefficient between the illuminance integrated value distributions associated with said point light sources.

8. A surface light source control apparatus as claimed in claim 6, wherein, for each of said groups, said light-emission level determining means determines, based on said illuminance integrated value distribution for said each group the light-emission level of each of said point light sources, so that a uniform illuminance distribution is achieved at said position corresponding to said exposure surface of said exposure target when said projection device is set so as to reflect all the light rays incident thereon toward said exposure surface.

9. A surface light source control method for a direct exposure apparatus in which light produced by a surface light source constructed from a plurality of point light sources is directed to a projection device for generating an exposure pattern, and the light reflected by said projection device is projected onto an exposure surface of an exposure target moving relative to said projection device, thereby forming a desired exposure pattern on said exposure surface, said method comprising:

a grouping step for dividing said point light sources into a plurality of groups based on similarity in tendency in terms of illuminance distribution characteristics that said point light sources have at a position corresponding to said exposure surface when said projection device is set so as to reflect all light rays incident thereon toward said exposure surface; and a light-emission level determining step for determining the light-emission level of each of said point light sources for each of said plurality of groups so that a uniform illuminance distribution is achieved at said position corresponding to said exposure surface of said exposure target when said projection device is set so as to reflect all the light rays incident thereon toward said exposure surface.

10. A surface light source control method as claimed in claim 9, wherein said light-emission level determining step determines said light-emission level so that all the point light sources belonging to the same group have the same light-emission level.

11. A surface light source control method as claimed in claim 10, wherein said grouping step comprises:

a measuring step for measuring, for each of said point light sources, the illuminance distribution at said position corresponding to said exposure surface of said exposure target when said point light sources are turned on one at a time while controlling said projection device so as to reflect all the light rays incident thereon toward said exposure surface;

an integrating step for computing for each of said point light sources an illuminance integrated value distribution along a direction orthogonal to the direction of said relative movement by integrating the intensity of illuminance associated with said each point light source along the direction of said relative movement based on said illuminance distribution measured for said each point light source; and a judging step for judging similarity in tendency in terms of said illuminance integrated value distribution among said point light sources, wherein any point light sources judged in said identifying step to be similar in tendency in terms of said illuminance integrated value distribution are determined as being similar in tendency in terms of said illuminance distribution characteristics and are grouped together so as to belong to the same group.

12. A surface light source control method as claimed in claim 11, wherein said judging step judges the similarity in tendency in terms of said illuminance integrated value distribution based on a correlation coefficient between the illuminance integrated value distributions associated with said point light sources.

13. A surface light source control apparatus as claimed in claim 11 wherein, for each of said groups, said light-emission level determining step determines based on said illuminance integrated value distribution for said each group the light-emission level of each of said point light sources so that a uniform illuminance distribution is achieved at said position corresponding to said exposure surface of said exposure target when said projection device is set so as to reflect all the light rays incident thereon toward said exposure surface.

14. A surface light source control method as claimed in claim 9, wherein said grouping step comprises:

a measuring step for measuring, for each of said point light sources the illuminance distribution at said position corresponding to said exposure surface of said exposure target when said point light sources are turned on one at a time while controlling said projection device so as to reflect all the light rays incident thereon toward said exposure surface;

an integrating step for computing for each of said point light sources an illuminance integrated value distribution along a direction orthogonal to the direction of said relative movement by integrating the intensity of illuminance associated with said each point light source along the direction of said relative movement based on said illuminance distribution measured for said each point light source; and a judging step for judging similarity in tendency in terms of said illuminance integrated value distribution among said point light sources, wherein all point light sources judged in said identifying step to be similar in tendency in terms of said illuminance integrated value distribution are determined as being similar in tendency in terms of said illuminance distribution characteristics and are grouped together so as to belong to the same group.

15. A surface light source control method as claimed in claim 14, wherein said judging step judges the similarity in tendency in terms of said illuminance integrated value distribution based on a correlation coefficient between the illuminance integrated value distributions associated with said point light sources.

16. A surface light source control apparatus as claimed in claim 14, wherein for each of said groups, said light-emission level determining step determines based on said illuminance integrated value distribution for said each group the light-emission level of each of said point light sources so that a uniform illuminance distribution is achieved at said position corresponding to said exposure surface of said exposure target when said projection device is set so as to reflect all the light rays incident thereon toward said exposure surface.

* * * * *